(12) United States Patent
Hori et al.

(10) Patent No.: US 11,707,799 B2
(45) Date of Patent: Jul. 25, 2023

(54) JOINING METHOD

(71) Applicant: NIPPON LIGHT METAL COMPANY, LTD., Tokyo (JP)

(72) Inventors: Hisashi Hori, Shizuoka (JP); Kosuke Yamanaka, Shizuoka (JP); Takeshi Handa, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 183 days.

(21) Appl. No.: 17/285,062

(22) PCT Filed: Jun. 17, 2019

(86) PCT No.: PCT/JP2019/023829
§ 371 (c)(1),
(2) Date: Apr. 13, 2021

(87) PCT Pub. No.: WO2020/129281
PCT Pub. Date: Jun. 25, 2020

(65) Prior Publication Data
US 2021/0346979 A1    Nov. 11, 2021

(30) Foreign Application Priority Data
Dec. 19, 2018 (JP) .................................. 2018-236943

(51) Int. Cl.
*B23K 20/00* (2006.01)
*B23K 20/12* (2006.01)
*B23K 103/10* (2006.01)

(52) U.S. Cl.
CPC ...... *B23K 20/1255* (2013.01); *B23K 20/1205* (2013.01); *B23K 2103/10* (2018.08)

(58) Field of Classification Search
CPC .............. B23K 20/1255; B23K 20/122; B23K 20/1225; B23K 20/126; B23K 20/125;
(Continued)

(56) References Cited

U.S. PATENT DOCUMENTS 5,726,964 A    3/1998 Van Kesteren et al.
5,739,937 A    4/1998 Liedenbaum et al.
(Continued)

FOREIGN PATENT DOCUMENTS

CA    2 884 230 A1    3/2014
CN    1462220 A       12/2003
(Continued)

OTHER PUBLICATIONS

Search Report for European Patent Application No. 19898076.5 (dated Aug. 24, 2022).
(Continued)

*Primary Examiner* — Erin B Saad
(74) *Attorney, Agent, or Firm* — Merchant & Gould P.C.

(57) ABSTRACT

The invention has a feature of comprising a butting process of forming a stepped butted portion and a joining process of performing friction-stir-welding on the stepped butted portion, wherein the rotary tool includes a base side pin having a taper angle larger than a taper angle of a tip side pin, and a pin step portion in a staircase shape is formed on an outer circumferential face of the base side pin, and wherein in the joining process, a rotation direction and a translation method of the rotary tool are set such that the second metal member is on an advancing side, a target angle by which a rotation axis of the rotary tool is inclined toward the second metal member is set such that a burr formed on a front face of the second metal member after the joining process has a thickness between 0 and 130 μm.

4 Claims, 13 Drawing Sheets

(58) Field of Classification Search
CPC .............. B23K 20/129; B23K 20/1245; B23K 20/123; B23K 20/12
See application file for complete search history.

(56) References Cited

U.S. PATENT DOCUMENTS

| | | | |
|---|---|---|---|
| 6,305,866 B1 | 10/2001 | Aota et al. | |
| 6,325,273 B1 | 12/2001 | Boon et al. | |
| 6,421,578 B1 | 7/2002 | Adams et al. | |
| 6,669,075 B2 | 12/2003 | Colligan | |
| 7,275,675 B1 | 10/2007 | Carter et al. | |
| 7,494,040 B2 | 2/2009 | Babb et al. | |
| 7,857,192 B2 | 12/2010 | Nagano | |
| 8,434,661 B2 | 5/2013 | Hovanski et al. | |
| 10,569,356 B1* | 2/2020 | Coffey | B23K 26/361 |
| 10,835,989 B2 | 11/2020 | Werz et al. | |
| 11,059,125 B2 | 7/2021 | Rosal et al. | |
| 11,141,812 B2 | 10/2021 | Ikeda et al. | |
| 11,185,945 B2* | 11/2021 | Hori | B23K 20/1265 |
| 11,185,946 B2* | 11/2021 | Hori | B23K 20/122 |
| 11,413,700 B2 | 8/2022 | Hori et al. | |
| 11,419,237 B2 | 8/2022 | Hori et al. | |
| 2002/0000461 A1 | 1/2002 | Jogan | |
| 2003/0024965 A1 | 2/2003 | Okamura et al. | |
| 2003/0209588 A1 | 11/2003 | Colligan | |
| 2004/0108359 A1 | 6/2004 | Hashimoto et al. | |
| 2005/0246884 A1 | 11/2005 | Chen | |
| 2006/0086775 A1 | 4/2006 | Trapp et al. | |
| 2006/0151576 A1 | 7/2006 | Akiyama et al. | |
| 2006/0289608 A1 | 12/2006 | Steel et al. | |
| 2007/0241163 A1 | 10/2007 | Valant et al. | |
| 2008/0067215 A1 | 3/2008 | Gendou | |
| 2008/0154423 A1 | 6/2008 | Badarinarayan et al. | |
| 2008/0251571 A1 | 10/2008 | Burford | |
| 2009/0072007 A1 | 3/2009 | Nagano | |
| 2010/0081005 A1 | 4/2010 | Aoh et al. | |
| 2010/0282822 A1 | 11/2010 | Nagano | |
| 2011/0180587 A1 | 7/2011 | Trapp et al. | |
| 2012/0153007 A1 | 6/2012 | Sall et al. | |
| 2014/0166731 A1 | 6/2014 | Seo et al. | |
| 2014/0367452 A1 | 12/2014 | Dinda et al. | |
| 2015/0097020 A1 | 4/2015 | Rosal et al. | |
| 2015/0174697 A1 | 6/2015 | Fukuda | |
| 2015/0290739 A1 | 10/2015 | Seo et al. | |
| 2016/0325374 A1 | 11/2016 | Hori et al. | |
| 2017/0216961 A1 | 8/2017 | Utter et al. | |
| 2018/0043465 A1 | 2/2018 | Hori | |
| 2018/0214975 A1 | 8/2018 | Werz et al. | |
| 2018/0272479 A1 | 9/2018 | Hori et al. | |
| 2019/0039168 A1* | 2/2019 | Hori | B23K 20/125 |
| 2019/0210148 A1 | 7/2019 | Luszczak et al. | |
| 2019/0283174 A1* | 9/2019 | Onose | B23K 11/04 |
| 2019/0358740 A1 | 11/2019 | Hori et al. | |
| 2020/0147718 A1 | 5/2020 | Hori et al. | |
| 2020/0164462 A1 | 5/2020 | Hori et al. | |
| 2020/0324365 A1 | 10/2020 | Hori et al. | |
| 2020/0353557 A1 | 11/2020 | Hori et al. | |
| 2021/0053144 A1 | 2/2021 | Hori et al. | |
| 2021/0146472 A1 | 5/2021 | Hori et al. | |
| 2021/0146473 A1 | 5/2021 | Hori et al. | |
| 2021/0213561 A1 | 7/2021 | Hori et al. | |
| 2021/0370433 A1 | 12/2021 | Hori et al. | |

FOREIGN PATENT DOCUMENTS

| | | |
|---|---|---|
| CN | 1654154 A | 8/2005 |
| CN | 101670481 A | 3/2010 |
| CN | 102317027 A | 1/2012 |
| CN | 102574239 A | 7/2012 |
| CN | 203209851 U | 9/2013 |
| CN | 103521912 A | 1/2014 |
| CN | 103949769 A | 7/2014 |
| CN | 104014926 A | 9/2014 |
| CN | 104227222 A | 12/2014 |
| CN | 104507630 A | 4/2015 |
| CN | 104646820 A | 5/2015 |
| CN | 105772935 A | 7/2016 |
| CN | 105899321 A | 8/2016 |
| CN | 107000114 A | 8/2017 |
| CN | 111032268 A | 4/2020 |
| DE | 20 2012 001 704 U1 | 5/2013 |
| DE | 10 2012 001 877 A1 | 8/2013 |
| DE | 10 2013 000 574 A1 | 7/2014 |
| EP | 1 400 302 A1 | 3/2004 |
| EP | 2835209 A1 | 2/2015 |
| JP | 11-267859 A | 10/1999 |
| JP | 2000-246465 A | 9/2000 |
| JP | 2001-269779 A | 10/2001 |
| JP | 2002-346766 A | 12/2002 |
| JP | 2003-48083 A | 2/2003 |
| JP | 2004-314115 A | 11/2004 |
| JP | 2006-212651 A | 8/2006 |
| JP | 2007-160370 A | 6/2007 |
| JP | 2008-73693 A | 4/2008 |
| JP | 2008-279513 A | 11/2008 |
| JP | 4210148 B2 | 1/2009 |
| JP | 2009-297761 A | 12/2009 |
| JP | 2010-36230 A | 2/2010 |
| JP | 2010-201484 A | 9/2010 |
| JP | 2012-125822 A | 7/2012 |
| JP | 2012-218001 A | 11/2012 |
| JP | 2013-27923 A | 2/2013 |
| JP | 2013-39613 A | 2/2013 |
| JP | 2015-131321 A | 7/2015 |
| JP | 2015-131323 A | 7/2015 |
| JP | 2016-87649 A | 5/2016 |
| JP | 2016-87650 A | 5/2016 |
| JP | 2016-150380 A | 8/2016 |
| JP | 2016-215264 A | 12/2016 |
| JP | 2017-42817 A | 3/2017 |
| KR | 10-2011-0088266 A | 8/2011 |
| KR | 10-2016-0071483 A | 6/2016 |
| TW | I294810 B1 | 3/2008 |
| WO | 2007/119343 A1 | 10/2007 |
| WO | 2009/104426 A1 | 8/2009 |
| WO | 2015/107716 A1 | 7/2015 |
| WO | 2016/072211 A1 | 5/2016 |
| WO | 2016/163214 A1 | 10/2016 |
| WO | 2020/095483 A1 | 5/2020 |
| WO | 2020/158081 A1 | 8/2020 |

OTHER PUBLICATIONS

International Search Report for No. PCT/JP2019/023829 dated Sep. 10, 2019.
International Search Report for No. PCT/JP2018/002207, dated Apr. 17, 2018.
International Search Report for No. PCT/JP2018/018951 dated Jun. 19, 2018.
International Search Report for No. PCT/JP2018/018966 dated Jun. 19, 2018.
International Search Report for No. PCT/JP2018/027337, dated Oct. 2, 2018.
International Search Report for No. PCT/JP2018/027338, dated Oct. 2, 2018.
International Search Report for No. PCT/JP2018/028833, dated Oct. 2, 2018.
International Search Report for No. PCT/JP2018/030412, dated Oct. 2, 2018.
International Search Report for No. PCT/JP2018/035949 dated Dec. 18, 2018.
International Search Report for No. PCT/JP2019/018216 dated Jul. 9, 2019.
International Search Report and Written Opinion for No. PCT/JP2018/035959 dated Dec. 25, 2018.
Office Action for Chinese Patent Application No. 201880029621.9, dated Dec. 17, 2020.
Office Action for Chinese Patent Application No. 201880053294.0 (dated Jul. 19, 2021).
Office Action for Chinese Patent Application No. 201880053448.6 (dated Mar. 3, 2021).

(56) References Cited

OTHER PUBLICATIONS

Office Action for Chinese Patent Application No. 201880076427.6, dated Jun. 1, 2021.
Office Action for Chinese Patent Application No. 201880081181.1 (dated May 2, 2021).
Office Action for Chinese Patent Application No. 201980035227.0 (dated Sep. 3, 2021).
Office Action for corresponding CN Application No. 201980035227.0 (dated Apr. 12, 2022).
Rejection Decision issued for Chinese Patent Application No. 201880029534.3. (dated Mar. 3, 2022).
Search Report for European Patent Application No. 18878273.4 (dated Jul. 15, 2021).
U.S. Appl. No. 16/624,250, filed Dec. 18, 2019, 2021-0146473 A, May 20, 2021.
U.S. Appl. No. 16/622,559, filed Dec. 13, 2019, 2021-0146472 A1, May 20, 2021.
U.S. Appl. No. 16/624,256, filed Dec. 18, 2019, 2020-0164462 A1, May 28, 2020.
U.S. Appl. No. 16/753,735, filed Apr. 3, 2020, U.S. Pat. No. 11,185,945 B2, Nov. 30, 2021.
U.S. Appl. No. 16/753,741, filed Apr. 3, 2020, U.S. Pat. No. 11,185,946 B2, Nov. 30, 2021.
U.S. Appl. No. 16/640,646, filed Feb. 20, 2020, 2020-0353557 A1, Nov. 12, 2020.
U.S. Appl. No. 16/640,661, filed Feb. 20, 2020, U.S. Pat. No. 11,419,237 B2, Aug. 16, 2022.
U.S. Appl. No. 16/959,087, filed Jun. 29, 2020, 2020-0324365 A1, Oct. 15, 2020.
U.S. Appl. No. 17/044,271, filed Sep. 30, 2020, 2021-0053144 A1, Feb. 25, 2021.
U.S. Appl. No. 17/058,601, filed Nov. 24, 2020, U.S. Pat. No. 11,413,700 B2, Aug. 16, 2022.

* cited by examiner

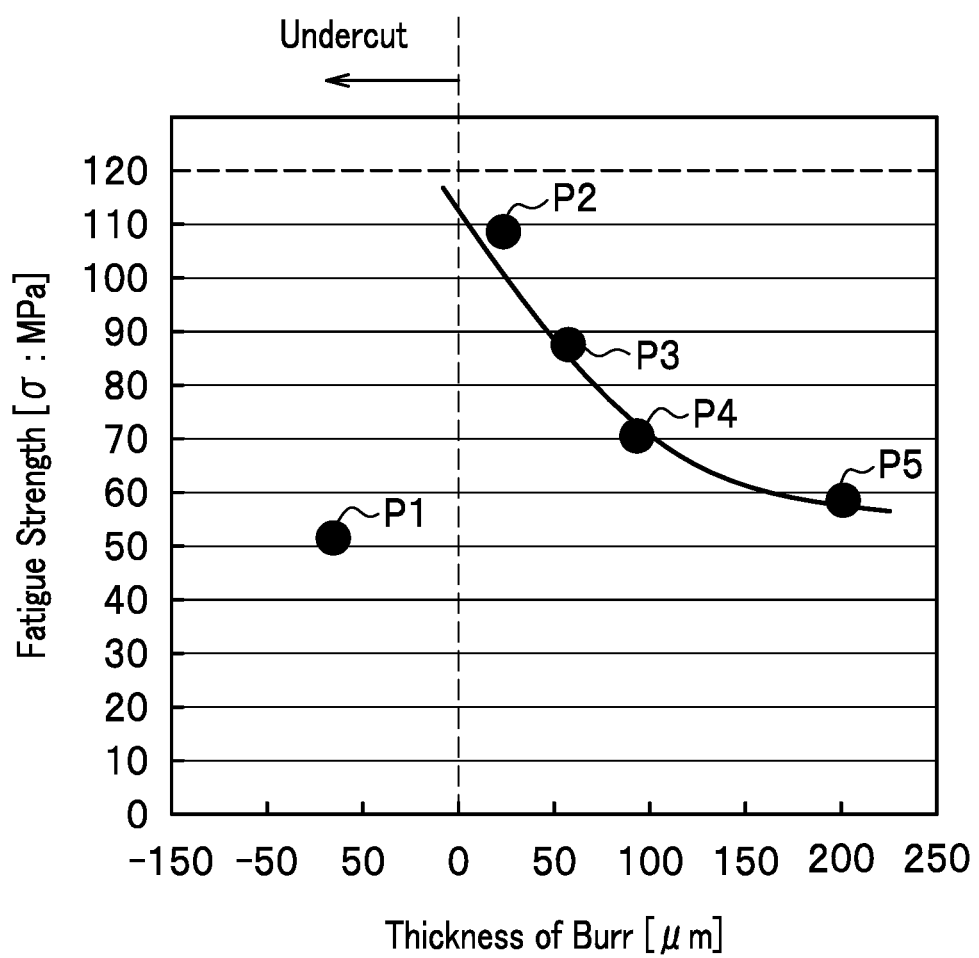

JOINING METHOD

This application is a National Stage Application of PCT/JP2019/023829, filed Jun. 17, 2019, which claims benefit of priority to Japanese Patent Application No. 2018-236943, filed Dec. 19, 2018, which applications are incorporated herein by reference. To the extent appropriate, a claim of priority is made to each of the above disclosed applications.

FIELD OF THE INVENTION

The present invention relates to a joining method.

DESCRIPTION OF THE RELATED ART

A technology to friction-stir-weld metal members that have different thicknesses with a rotary tool has been known. An invention described in Patent Document 1 is intended to perform friction-stir-welding on metal members that have different thicknesses by inserting a rotary tool vertically into a stepped butted portion of the metal members and moving the rotary tool along the stepped butted portion.

PRIOR ART DOCUMENT

Patent Document

Patent Document 1: JP2012-218001A

SUMMARY OF THE INVENTION

Objective to be Achieved by the Invention

The conventional joining technology cannot sufficiently hold down a plastically flowing material while the metal members are being joined, because there is a space between the rotary tool and one of the metal members. As a result, there is a problem with the conventional joining technology that there are a lot of burrs produced, which results in the joint strength being not high enough.

In order to work out this problem, the present invention is intended to provide a joining method with which the joint strength is increased with less burrs being produced.

Means to Achieve the Objective

The present invention has an aspect of comprising a butting process of a butting process of butting an end face of a first metal member and an end face of a second metal member against each other to form a butted portion that is stepped with a second front face of the second metal member being lower than a first front face of the first metal member and a joining process of performing friction-stir-welding on the butted portion that is stepped with a rotary tool, wherein the rotary tool includes a base side pin and a tip side pin, a taper angle of the base side pin is larger than a taper angle of the tip side pin, and a pin step portion in a staircase shape is formed on an outer circumferential face of the base side pin, wherein in the joining process, a rotation direction and a translation direction of the rotary tool are set to such directions that the second metal member is on an advancing side, a target angle by which a rotation axis of the rotary tool is inclined toward the second metal member is set to such an angle that a burr formed after the joining process on the second metal member has a thickness between 0 and 130 μm, and friction-stirring is performed with the target angle of the rotary tool kept unchanged and with a plastically flowing material being held down by a step bottom face of the pin step portion in the joining process.

According to this joining method, the rotary tool is inclined toward the second metal member and the front faces of the first and second metal members can be sufficiently held down with the outer circumferential face of the base side pin having a larger taper angle, which contributes to inhibiting burrs being produced and increasing the joint strength. If the burr formed on the front face of the second metal member has a thickness less than 0, which means that an undercut portion is produced, then the joint strength lowers. Alternatively, if the thickness of the burr exceeds 130 μm, there are many burrs produced and the joint strength lowers because of shortage of metal at the joint portion.

In addition, the target angle is preferably set to such an angle that in a cross-sectional plane that includes a rotation axis of the rotary tool and is perpendicular to a translation direction in which the rotary tool moves, an intersection point e is positioned on or above the front face of the second metal member, where the intersection point e is rotationally symmetrical to an intersection point d with respect to the rotation axis, the inter section point d being an intersection point between the outer circumferential face of the base side pin and the front face of the first metal member.

Furthermore, the target angle is preferably set to such an angle that an inequality of $-0.05\,\theta+0.16 \leq s \leq -0.05\,\theta+0.40$ is met, where s is the thickness of the burr in mm and $\theta$ is the target angle (°), when a thickness ratio of the first metal member to the second metal member is between 1.33 and 2.

The joining method as described enables preventing an undercut portion being formed and the thickness of the burr becoming larger.

Effect of the Invention

The joining method of the present invention enables reducing burrs and increasing the joint strength.

BRIEF DESCRIPTION OF THE DRAWINGS

FIG. 13 is a graph showing a result of TEST 1 indicating a relation between a thickness of a burr and a fatigue strength.

EMBODIMENT TO PRACTICE THE INVENTION

Figure 1:
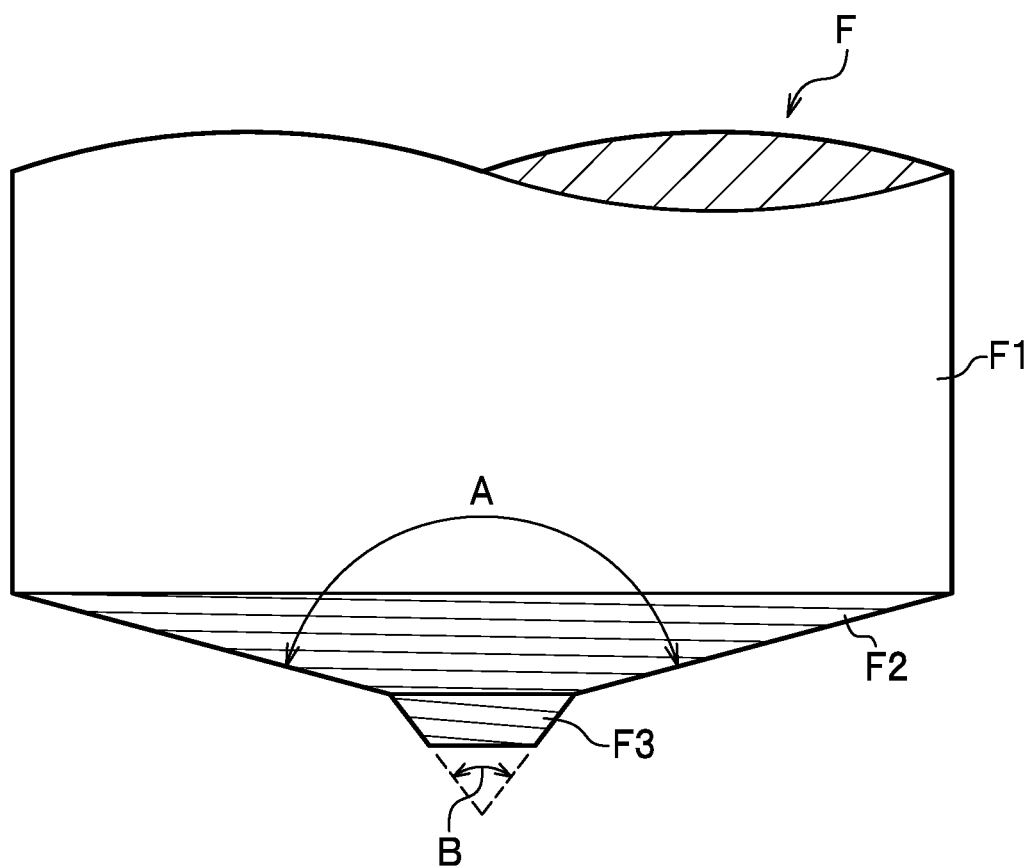
FIG. 1 shows a side elevation view of a joining rotary tool of an embodiment of the present invention.

An embodiment of the present invention is described with appropriate reference to the drawings. To begin with, a joining rotary tool (rotary tool) for the embodiment is described. The joining rotary tool is a tool to be used for friction-stir-welding. As shown in FIG. 1, a joining rotary tool F consists mainly of a base shaft portion F1, a base side pin F2 and a tip side pin F3. The base shaft pin F1 is in a columnar shape and secured to a main shaft of a friction stir welding apparatus.

Figure 2:
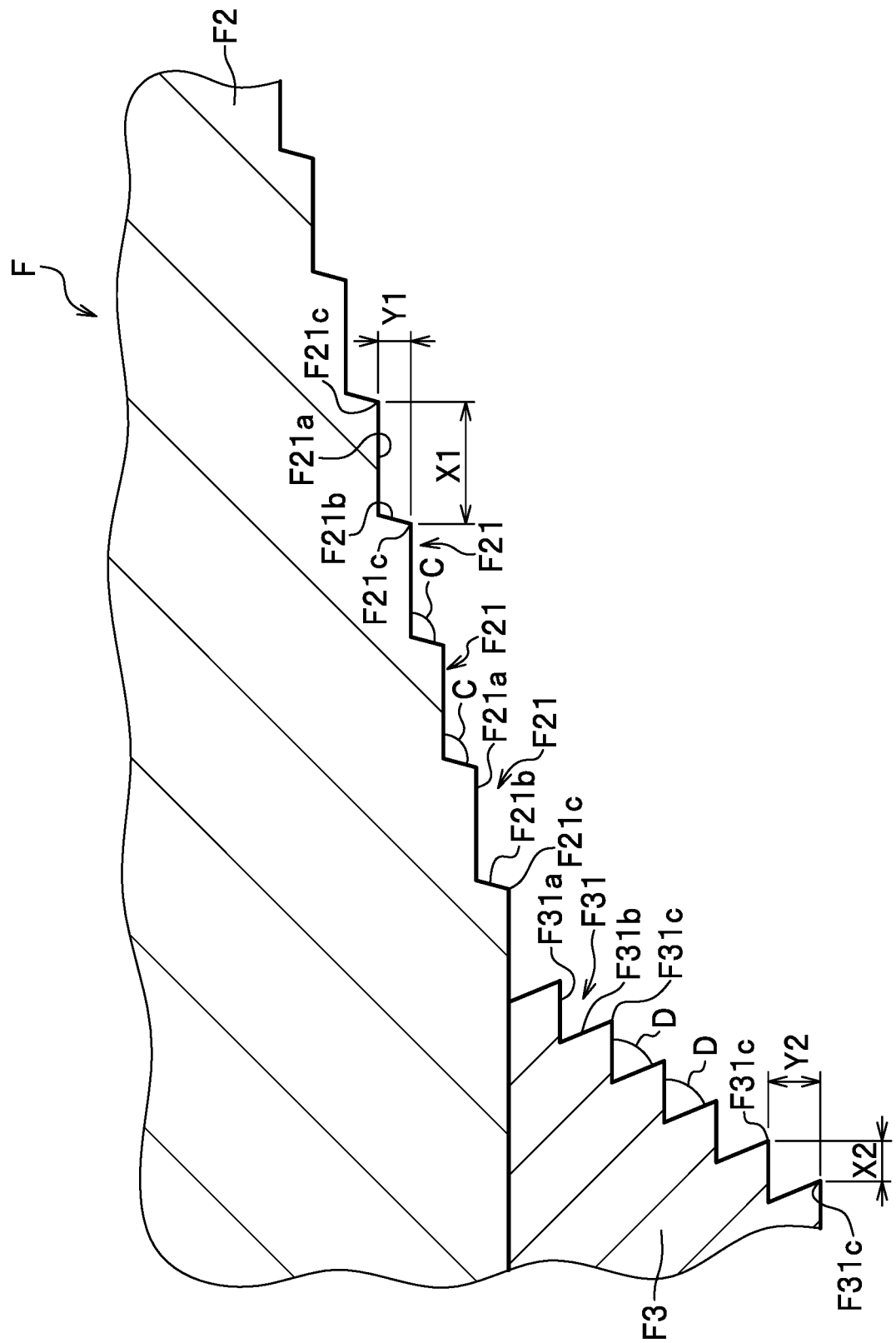
FIG. 2 shows an enlarged cross-sectional view of the joining rotary tool.

The base side pin F2 is formed to extend from the base shaft portion F1 and tapers to be thinner toward its tip. The base side pin F2 is in a conical shape with its tip portion cut off. The base side pin F2 has a taper angle A that may be appropriately formed to be, for example, between 135° and 160°. If the taper angle A is smaller than 135° or larger than 160°, a surface roughness of the joined portion becomes large. The taper angle A is formed to be larger than a taper angle B of the tip side pin F3 to be described later. As shown in FIG. 2, a pin step portion F21 in a staircase shape is formed over a whole outer circumferential face of the base side pin F2 in its height direction. The pin step portion F21 is formed in a clockwise or counterclockwise spiral shape. That is, the pin step portion F21 is seen in a spiral shape in its plan view and in a staircase shape in its side view. Since the joining rotary tool F is rotated clockwise for this embodiment, the pin step portion F21 is formed in the clockwise shape from a base side to a tip side of the base side pin F2.

Since the joining rotary tool F is rotated clockwise for this embodiment, the pin step portion F21 is preferably formed in the clockwise shape from a base side to a tip side of the base side pin F2. This enables reducing an amount of metal coming out of the metal members to be joined, because the plastically flowing material is directed toward the tip side of the base side pin F2 by the pin step portion F21. The pin step portion F21 is formed by a step bottom face F21a and a step side face F21b. A length X1 (horizontal direction length) between two apexes F21c, F21c next to each other of a pin step portions F21 is appropriately set based on a step angle C and a height Y1 of the step side face F21b, which are described later.

The height Y1 of the step side face F21b may be appropriately set, for example, to between 0.1 and 0.4 mm. If the height Y1 is smaller than 0.1 mm, the joined portion has a relatively large surface roughness. On the other hand, if the height Y1 is larger than 0.4 mm, the joined portion tends to have a relatively large surface roughness and the number of effective steps (number of steps of the pin step portion F21 being in contact with the metal member to be joined) becomes fewer.

The step angle C made between the step bottom face F21a and the step side face F21b may appropriately set and, for example, to between 85° and 120°. The step bottom face F21a in this embodiment is in parallel with a horizontal plane. The step bottom face F21a may be inclined by between −5° and 15° relative to the horizontal plane from a rotation axis of the rotary tool toward its outer circumference (a minus angle corresponds to the step bottom face F21a extending outward inclining downward relative to the horizontal plane and a plus angle corresponds to the step bottom face F21a extending outward inclining upward relative to the horizontal plane). The length X1, the height Y1 of the step side face F21b, the step angle C and the angle of the step bottom face F21a relative to the horizontal plane are set in such a manner that the plastically flowing material flows out of the pin step portion F21 without being stuck on and adhering to the pin step portion F21 and is sufficiently held down by the step bottom face F21a for the joined portion to have a relatively small surface roughness.

As shown in FIG. 1, the tip side pin F3 is formed to extend continuously from the base side pin F2. The tip side pin F3 is in a conical shape with its tip portion cut off. The tip side pin F3 has a flat face that is formed on its tip portion. The tip side pin F3 has a taper angle B that is smaller than the taper angle A of the base side pin F2. As shown in FIG. 2, a spiral groove F31 is engraved on an outer circumferential face of the tip side pin F3. The spiral groove F31 may be formed clockwise or counterclockwise. The spiral groove F31 may be engraved clockwise or counterclockwise from a base side to a tip side of the tip side pin F3 of the joining rotary tool F. However, since the joining rotary tool F is rotated clockwise in this embodiment, the spiral groove F31 is engraved counterclockwise from a base side to a tip side of the tip side pin F3 of the joining rotary tool F.

If the joining rotary tool F is rotated counterclockwise, the spiral groove F31 is preferably formed clockwise from the base side to the tip side of the tip side pin F3. This enables reducing an amount of metal coming out of the metal members to be joined, because the plastically flowing material is directed toward the tip side of the tip side pin F3 by the spiral groove F31. The spiral groove F31 is formed by a spiral bottom face F31a and a spiral side face F31b. A length X2 denotes a length (horizontal direction length) between two apexes F31c, F31c next to each other of a pin step portion F31. A height Y2 denotes a height of the spiral side face F31b. A spiral angle D made between the spiral bottom face F31a and the spiral side face F31b may be set, for example, to between 45° and 90°. The spiral groove F31 is intended to have a function of contacting metal members to be joined to increase friction heat and direct the plastically flowing material toward the tip side.

Figure 3:
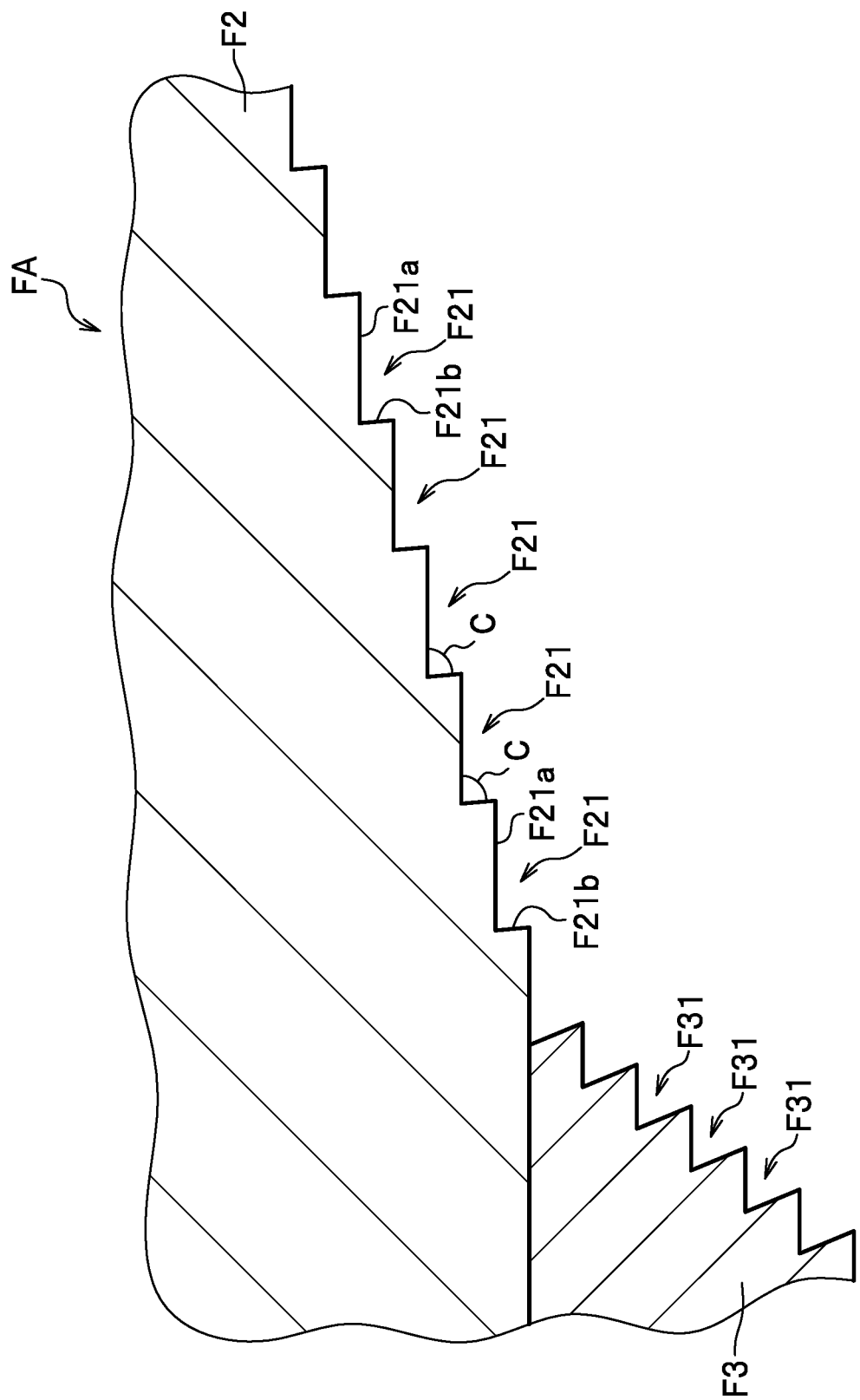
FIG. 3 is a cross-sectional view of a joining rotary tool of a first modification example.

The configuration of the joining rotary tool F may be appropriately modified. FIG. 3 is a side elevation view of a first modification example of the rotary tool of the present invention. As shown in FIG. 3, a joining rotary tool FA of the first modification example has the step angle C between the step bottom face F21a of the pin step portion F21 and the pin step side face F21b of the pin step portion F21, the step angle being equal to 85°. The step bottom face 21a is in parallel with the horizontal plane. Thus, the step angle C may be set to such an acute angle that the plastically flowing material is able to come out of the pin step portion F21 without being stuck on and adhering to the pin step portion F21 while friction-stirring is being performed, if the step bottom face F21a is in parallel with the horizontal plane.

Figure 4:
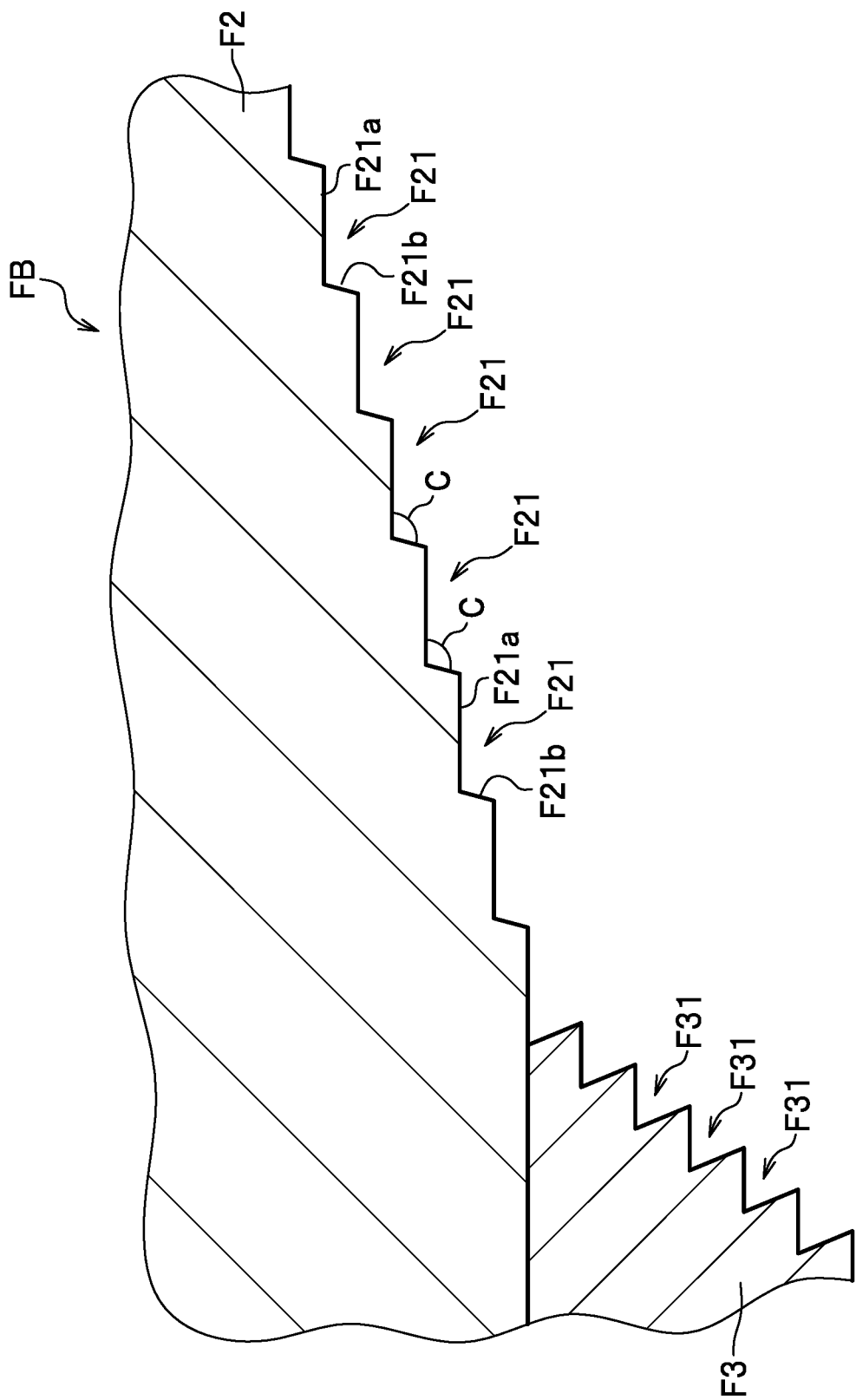
FIG. 4 is a cross-sectional view of a joining rotary tool of a second modification example.

FIG. 4 is a side elevation view of a second modification example of the joining rotary tool of the present invention. As shown in FIG. 4, a joining rotary tool FB of the second modification example has the step angle C of the pin step portion F21 being equal to 115°. The step bottom face F21a is in parallel with the horizontal plane. Thus, the step angle C may be set to an obtuse angle with the step bottom face F21a being in parallel with the horizontal plane as long as the pin step portion F21 functions as intended.

Figure 5:
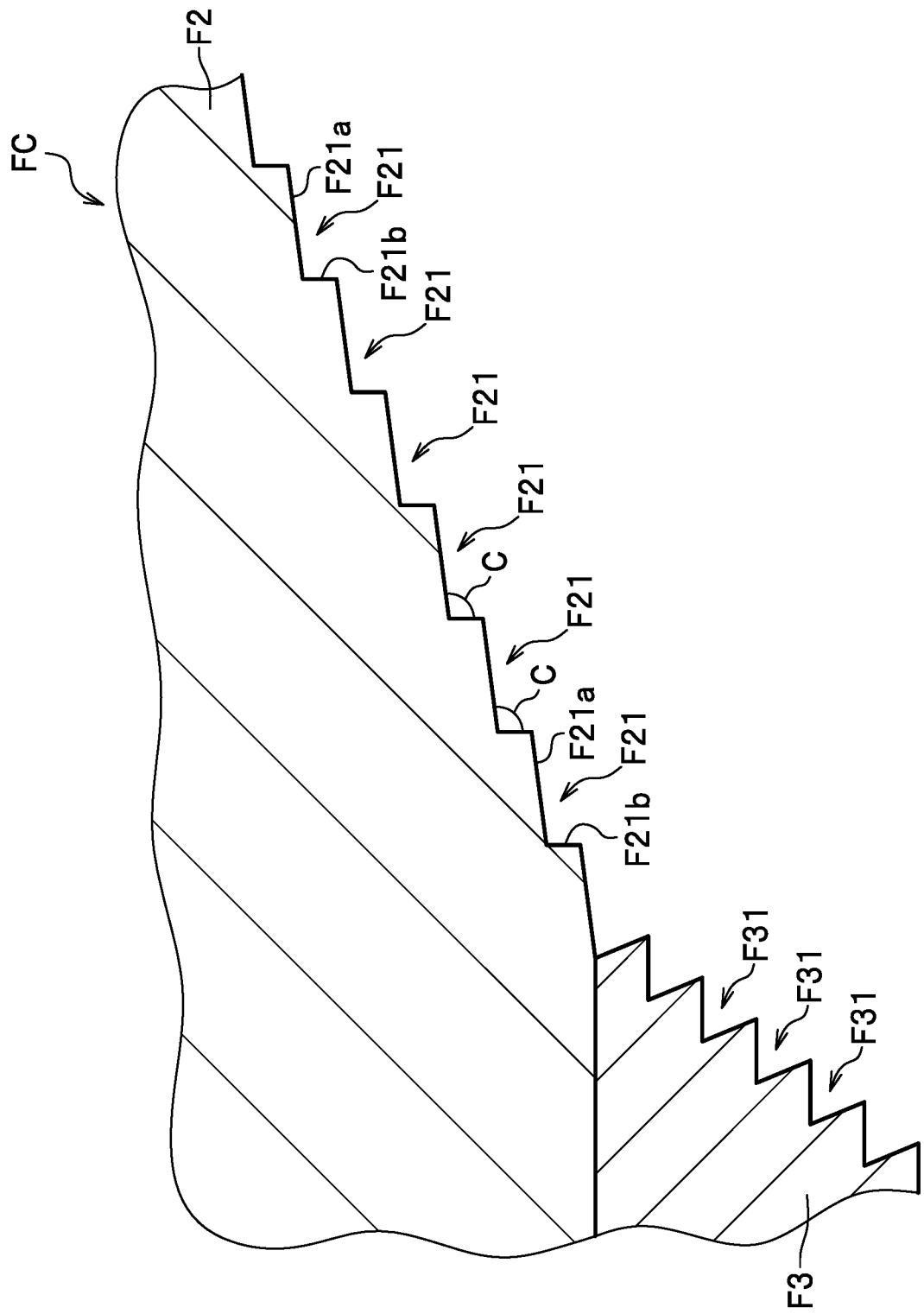
FIG. 5 is a cross-sectional view of a joining rotary tool of a third modification example.

FIG. 5 is a side elevation view of a third modification example of the joining rotary tool of the present invention. As shown in FIG. 5, a joining rotary tool FC has a step bottom face F21a extending from a rotation axis side toward an outer periphery inclining upward at 10° to the horizontal plane. The step side face F21b is in parallel with a vertical plane. Thus, the step bottom face F21a may be formed to incline upward relative to the horizontal plane from the rotation axis side toward an outer circumference as long as the plastically flowing material can be held down while friction-stirring is being performed. If any of the joining tools of the first to third modification examples above mentioned is used, an equivalent effect to that for the embodiments described below is obtained.

First Embodiment

Next, the joining method of the embodiment is explained. The joining method of the embodiment includes a butting process and a joining process. In the description below, a "front face" means an opposite face of a "back face".

Figure 6:
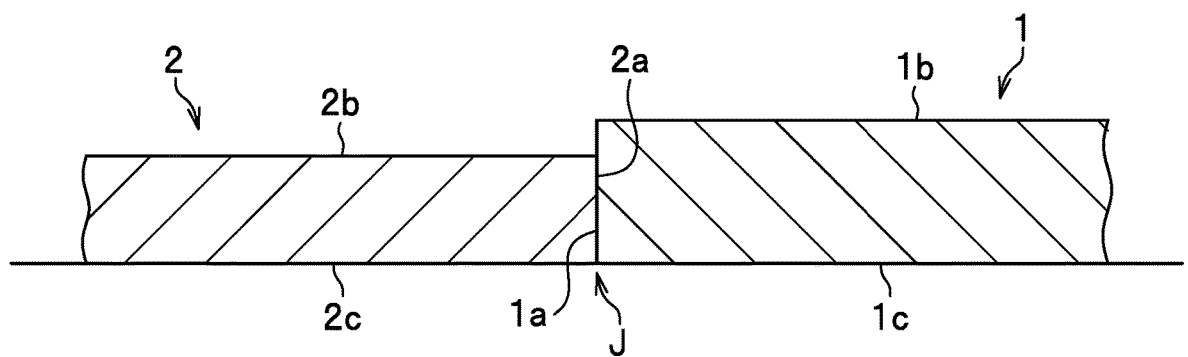
FIG. 6 shows a cross-sectional view of a butting process of the joining method of the embodiment.

The butting process is a process in which a first metal member 1 is butted against a second metal member 2, as shown in FIG. 6. The first metal member 1 and the second metal member 2 are made of a metal that can be friction-stirred such as aluminum, an aluminum alloy, copper, a copper alloy, titan, a titan alloy, magnesium, or a magnesium alloy. The first metal member 1 and the second metal member 2 used for this embodiment are made of an aluminum alloy. The first metal member 1 and the second metal member 2 used for this embodiment may be made different kinds of metals.

The first metal member 1 has a larger thickness than the second metal member 2 does. Since a back face 1c of the first metal member 1 is flush with a back face 2c of the second metal member 2, there is a step at the butted portion J where end faces 1a, 2a are butted against each other. A thickness ratio between the first metal member 1 and the second metal member 2 may be appropriately set. For instance, if the thickness of the second metal member 2 is 1, the thickness of the first metal member 1 may be set to be between 1.2 and 2.5, preferably between 1.33 and 2.0. Alternatively, two metal members having an identical thickness may be butted against each other in the butting process in such a manner that there is a step between these metal members.

Figure 7:
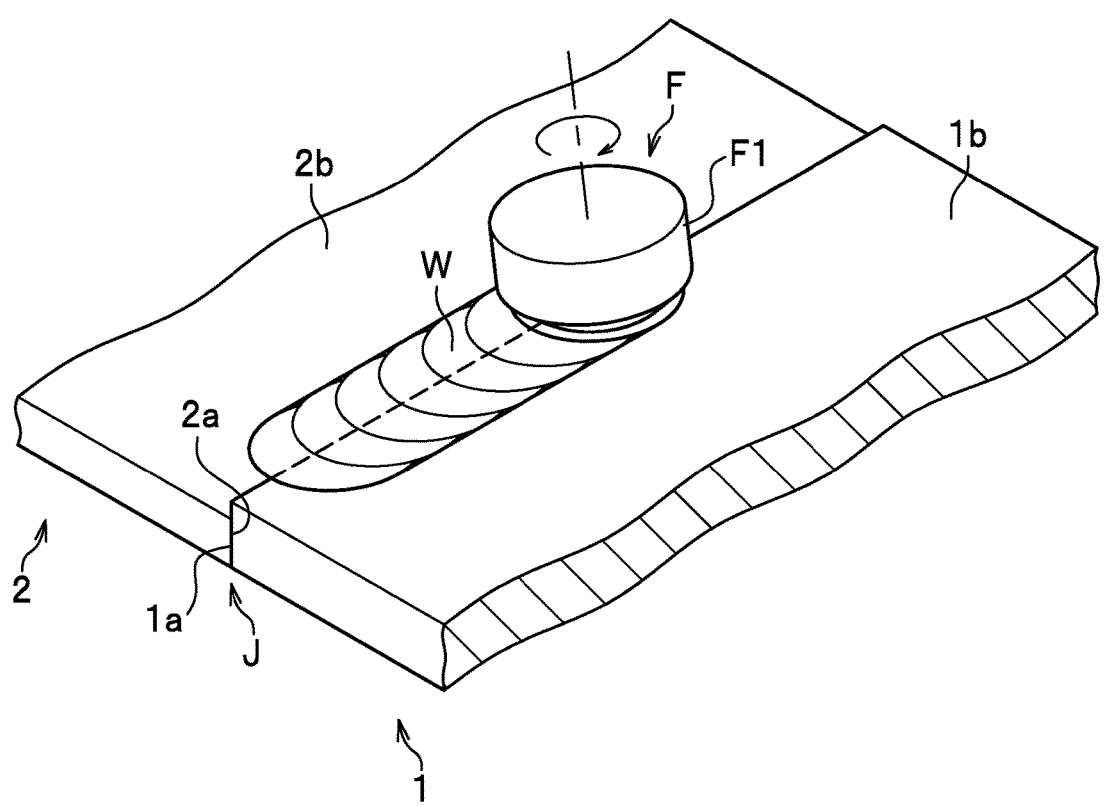
FIG. 7 is a perspective view of a joining process of the joining method of the embodiment.

The joining process is a process in which friction-stir-welding is performed on the butted portion J with the joining rotary tool F as shown in FIG. 7. In this joining process, the joining rotary tool F that is rotating clockwise is inserted into the butted portion J and made to move along the butted portion J. In this embodiment, the first metal member 1 is on the right side of the translation direction of the joining rotary tool F that is rotating clockwise. As a result, the second metal member 2 is on the advancing side while the first metal member 1 is retreating side.

The advancing side (shear side) is a side where a relative speed of an outer circumference of the joining rotary tool F relative to a portion to be joined corresponds to a summation of a tangent speed of the outer circumference of the joining rotary tool F that is rotating and a translation speed of the joining rotary tool F. On the contrary, the retreating side (flow side) corresponds to a side where the relative speed of the outer circumference of the joining rotary tool F relative to the portion to be joined becomes lower with the joining rotary tool F rotating in such a direction that the tangent speed of the circumference of the joining rotary tool F that is rotating is in the opposite direction to the translation direction of the joining rotary tool F.

Figure 8:
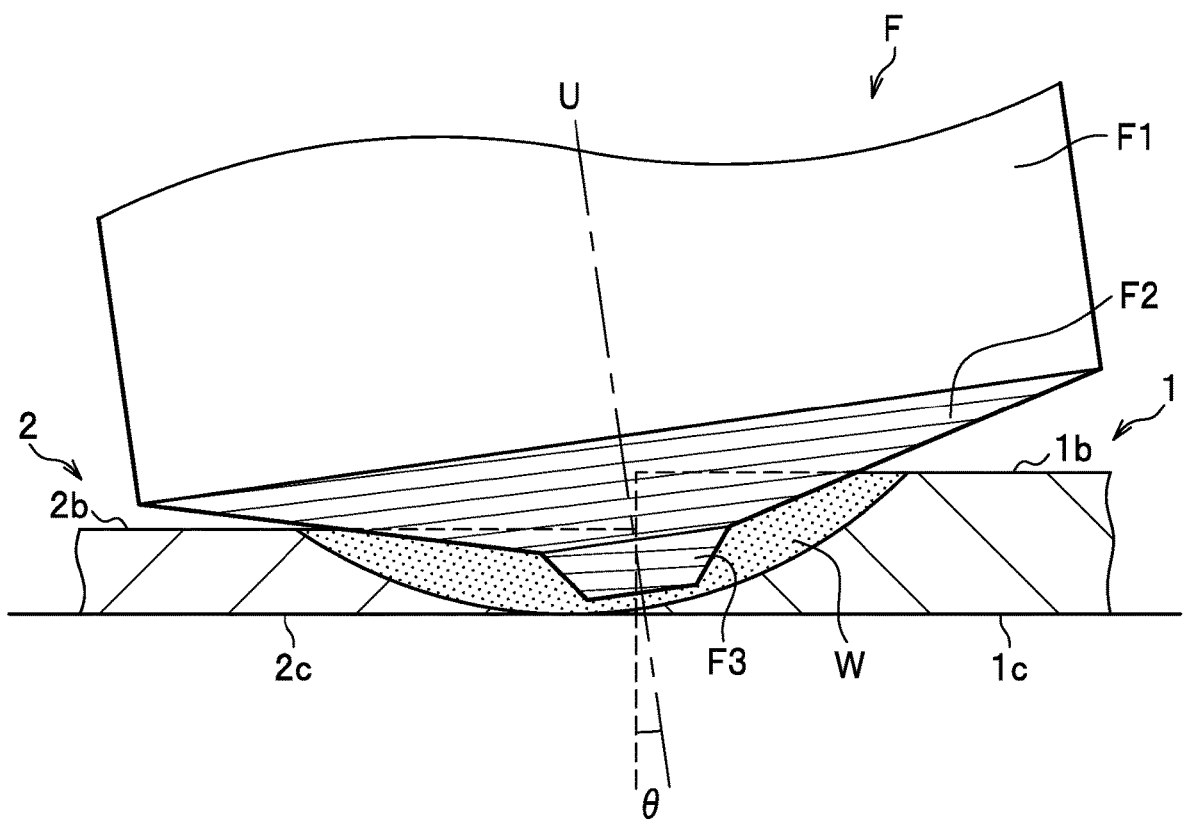
FIG. 8 shows a cross-sectional view of the joining process of the joining method of the embodiment.

As shown in FIG. 8, friction-stirring in the joining process is performed with a rotation axis U of the joining rotary tool F kept inclined by an inclination angle θ (target angle) toward the second metal member 2 relative to the butted face (end faces 1a, 2a). A plasticized zone W is formed along the translation track along which the joining rotary tool F has moved.

Figure 9:
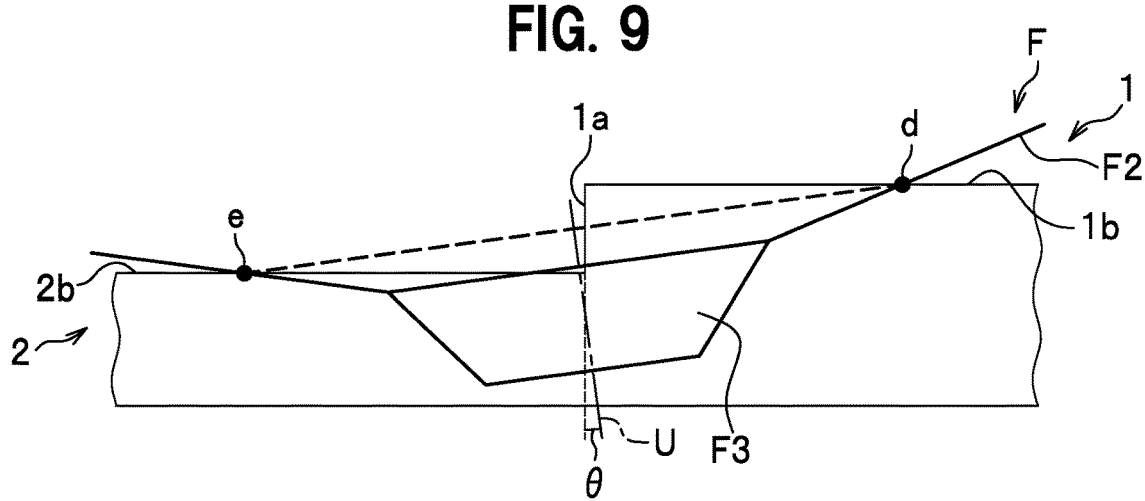
FIG. 9 shows a cross-sectional view of the joining process to illustrate a target angle.
Figure 10:
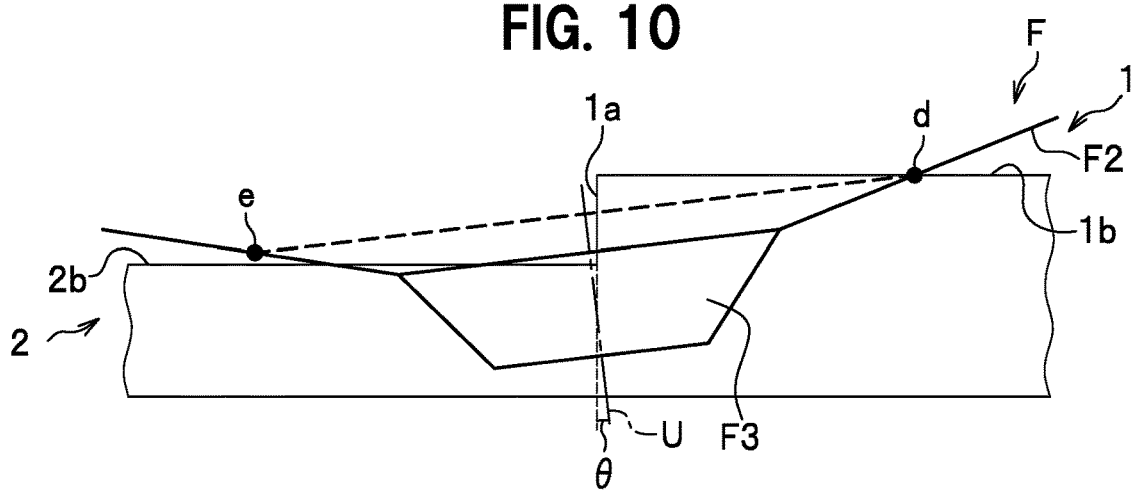
FIG. 10 shows a cross-sectional view of the joining process to illustrate the target angle.
Figure 11:
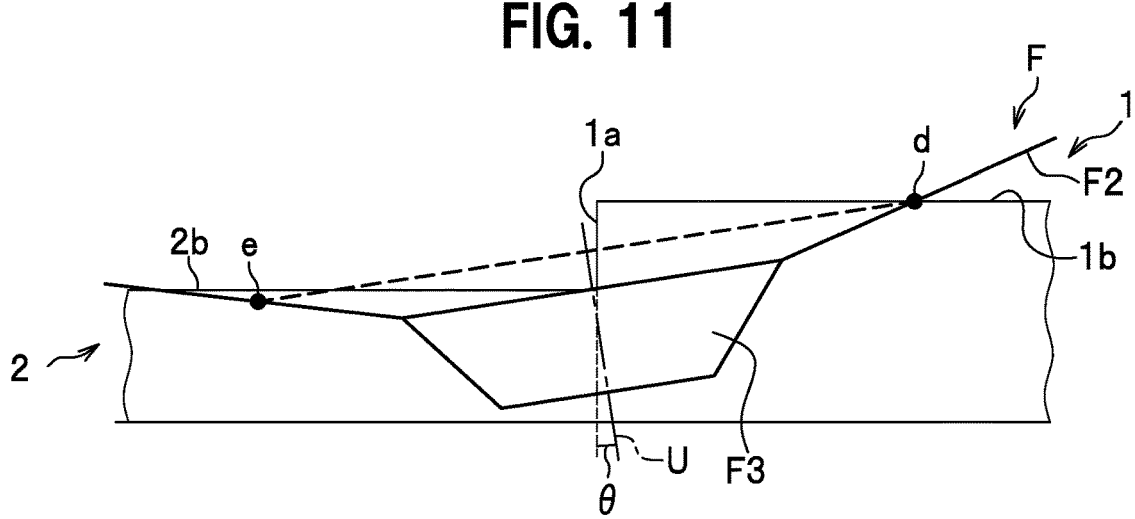
FIG. 11 shows a cross-sectional view of the joining process to illustrate the target angle.

FIGS. 9 to 11 show cross-sectional views of the joining process illustrating a target angle. As shown in FIG. 9, a contact point at which the outer circumferential face of the base side pin F2 intersects with the front face 1b of the first metal member 1 in the cross-sectional view is referred to as an intersection point d and a point that is to be rotationally symmetrical to the intersection point d with respect to the rotation axis U is referred to as an intersection point e. Then, the target angle may be set to such an angle that the intersection point e is positioned on the front face 2b of the second metal member 2 in the cross-sectional view.

Otherwise, as shown in FIG. 10, the target angle may be set to such an angle that the intersection point e is positioned above the front face 2b of the second metal member 2 in the cross-sectional view. However, if the intersection point e is too far away from the front face 2b of the second metal member 2, the plastically flowing material cannot be held down sufficiently, and a burr formed on the front face 2b of the second metal member 2 becomes thick.

On the other hand, as shown in FIG. 11, if the intersection point e is positioned below the front face 2b of the second metal member 2, an undercut portion is formed along the translation track along which the joining rotary tool F has moved, which is not preferable.

The inclination angle (target angle) θ may be appropriately set to such an angle that the thickness of the burr formed on the front face 2b of the second metal member 2 becomes between 0 and 130 μm after the joining process. To be more specific, the inclination angle (target angle) θ is preferably set to such an angle that an inequality 1 of −0.05 θ+0.16≤s≤·0.05 θ+0.40 is met, where s (mm) denotes a thickness of the burr formed on the front face 2b of the second metal member 2.

According to the joining method of the embodiment as has been described, the front face 1b of the first metal member 1 and the front face 2b of the second metal member 2 are held down by the outer circumferential face of the base side pin F2 whose taper angle is larger with the joining rotary tool F kept inclined toward the second metal member 2. As a result, the resultant burr can be made smaller, and the joint strength can be increased. If the thickness of the burr is smaller than 0, which corresponds to an undercut portion being formed, the joint strength decreases. Alternatively, if the thickness of the burr exceeds 130 μm, the joint portion is short of metal, which results in the joint strength becoming lower.

Figure 12A:
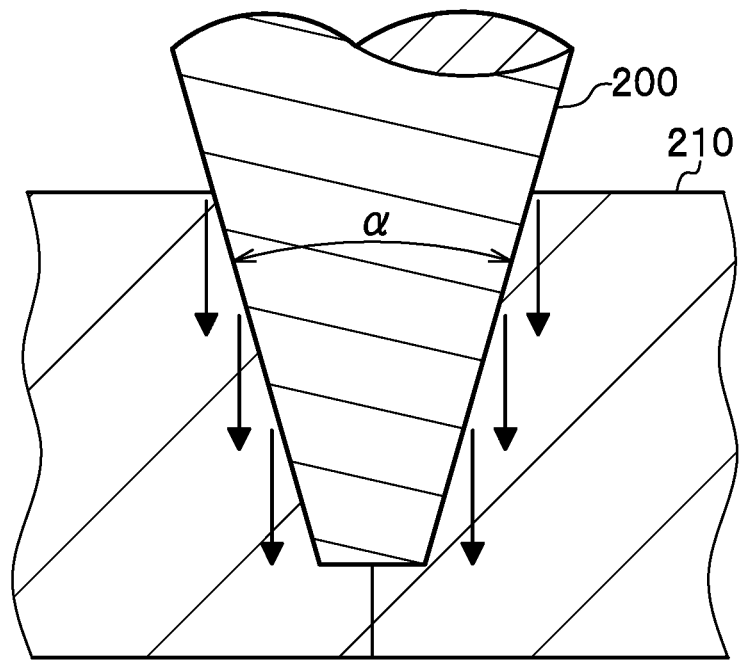
FIG. 12A shows a cross-sectional view of a conventional joining rotary tool.
Figure 12B:
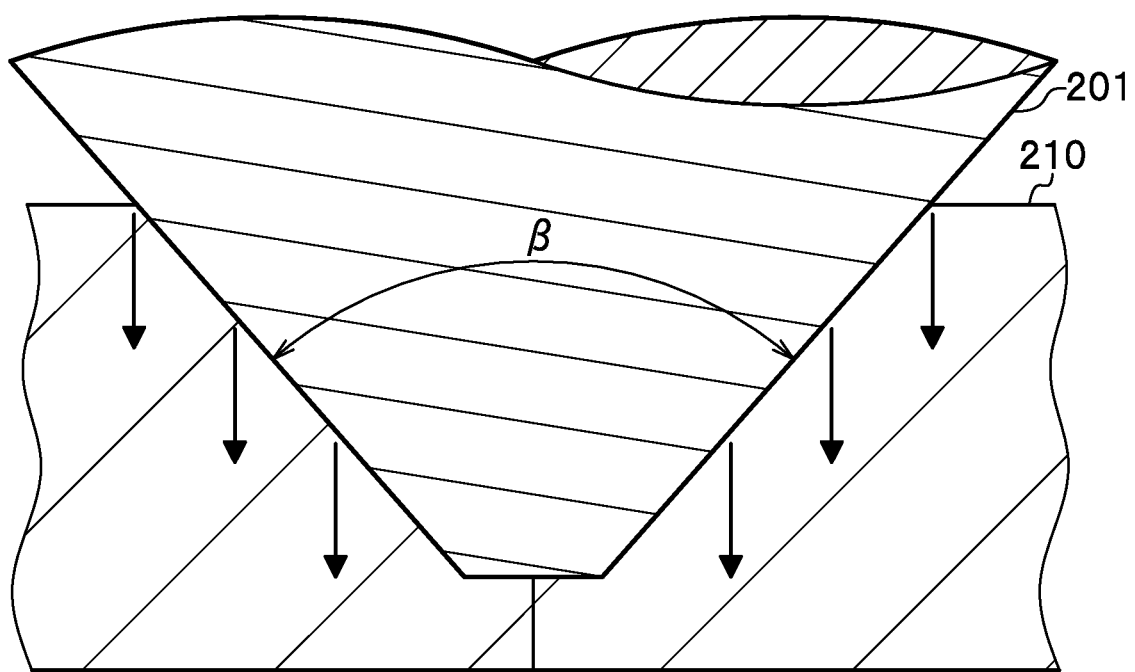
FIG. 12B shows a cross-sectional view of a conventional joining rotary tool.

In this joining method, for instance, if a conventional rotary tool 200 is used as shown in FIG. 12A, an uneven concave groove (concave groove formed by the front face of the joined metal member and the surface of the plasticized zone) becomes large and the joined portion has a relatively large surface roughness, because a front face of the joined metal member 210 is not held down. In addition, there is a problem with a raised portion (a portion that is formed by the front face of the joined metal member being raised compared with the front face before joined) being formed near the uneven concave groove. Alternatively, if a rotary tool 201 having a taper angle β that is larger than the taper angle α of the rotary tool 200 as is shown in FIG. 12B, the uneven concave groove becomes smaller and the raised portion becomes smaller as well, because the front face of the joined metal member 210 is held down sufficiently. However, a kissing-bond is easily formed under the plasticized zone, because the stronger downward plastically flowing of metal occurs.

On the other hand, the joining rotary tool F of the embodiment includes the base side pin F2 and the tip side pin F3 whose taper angle is smaller than the taper angle A of the base side pin F2. This structure makes it easier to insert the joining rotary tool F into the butted portion J. In addition, since the taper angle B of the tip side pin F3 is smaller, the joining rotary tool F can be easily inserted to a deep position in the butted portion J. In addition, since the taper angle B of the tip side pin F3 is smaller, the downward plastically flowing of friction-stirred material is reduced compared with the rotary tool 201. As a result, it is possible to prevent a kissing-bond from being formed under the plasticized zone W. In addition, since the taper angle A of the base side pin F2 is larger, joining can be stably more performed than with the conventional rotary tool if the thickness of the metal member to be joined or the height at which joining is done varies.

Additionally, since the plastically flowing material can be held down by the outer circumferential face of the base side pin F2, the uneven concave groove formed on the surface of the joined portion is made small and the raised portion that can be formed near the uneven concave groove is not formed or can be made smaller. In addition, since the pin step portion F21 is shallow and has a wide exit, the plastically flowing material can easily move out of the pin step portion F21 while the plastically flowing material is being held down by the step bottom face F21a. Therefore, the plastically flowing material cannot easily get stuck on and adhere to the outer circumferential face of the base side pin F2. As a result, it is possible to inhibit a burr being formed, make the surface roughness of joined portion smaller and stabilize the joining quality.

Example

Two kinds of tests, TEST 1 and TEST 2 have been carried out. TEST 1 is intended to examine a relation between the thickness of the burr and a fatigue strength and TEST 2 is intended to examine a relation between the thickness of the burr and the inclination angle (target angle) θ of the joining rotary tool F. In TEST 1, the first metal members 1 and the second metal members 2, both of which are made of an aluminum alloy, A5052, were prepared. The fatigue strength of each of these members is 120 MPa. There were five test pieces, P1 to P5, prepared for TEST 1. The inclination angles (target angle) θ that were tested were an inclination angle $\theta_1$ for the test piece P1, an inclination angle $\theta_2$ for the test piece P2, an inclination angle $\theta_3$ for the test piece P3, an inclination angle $\theta_4$ for the test piece P4 and an inclination angle $\theta_5$ for the test piece P5. These inclination angles vary according to a relation of $\theta_1>\theta_2>\theta_3>\theta_4>\theta_5$.

Figure 14:
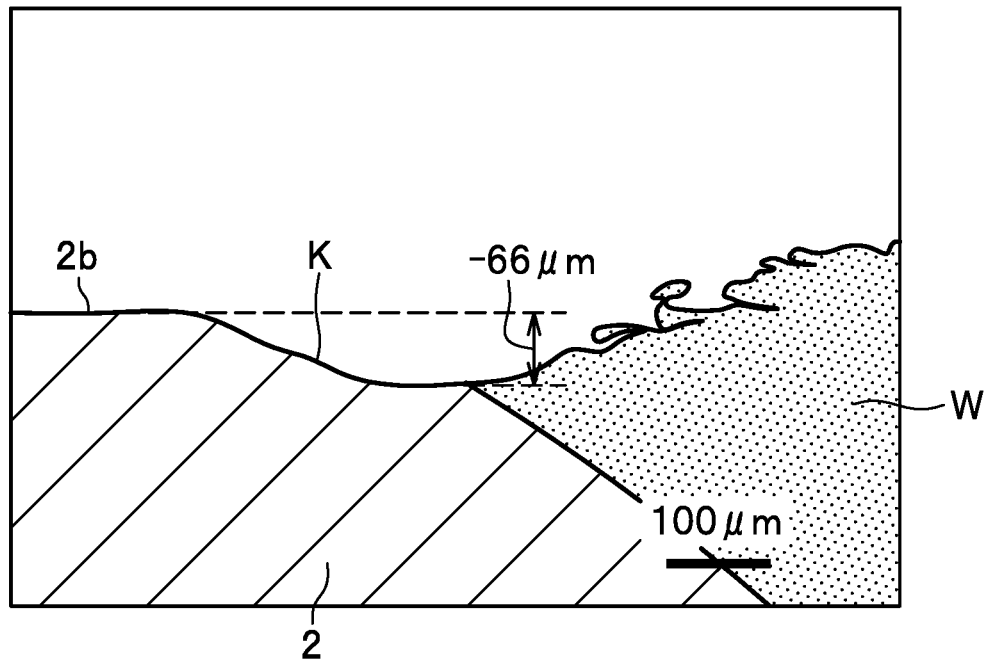
FIG. 14 shows schematically a macro structure of a test piece P1 for TEST 1 around a boundary between a front face of a second metal member and a plasticized zone.

The test piece P1 was prepared through the joining process with the intersection point e kept below the front face 2b of the second metal member 2 as shown in FIG. 11. An undercut portion K was formed on the front face 2b of the second metal member 2 of the test piece P1, as shown in FIG. 14. A depth of the undercut portion was approximately 66 μm. For the convenience of description, the depth of this undercut portion K is referred to as "burr thickness=−66 μm". That is, when the burr thickness is less than 0, it follows that there is an undercut portion K formed on the front face 2b of the second metal member 2.

As shown in FIG. 13, the fatigue strength of the test piece P1 was approximately 52 MPa, which was lower than the threshold value 60 MPa. That is, the fatigue strength of the test piece P1 was low because of the undercut portion K formed on the front face K of the second metal member 2.

Figure 15:
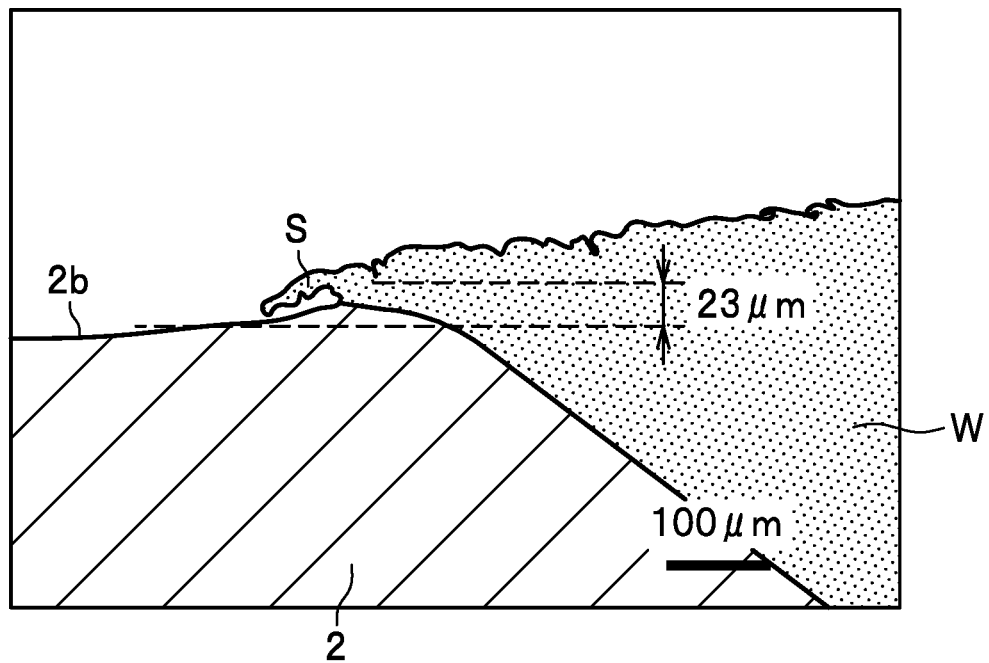
FIG. 15 shows schematically a macro structure of a test piece P2 for TEST 1 around a boundary between a front face of a second metal member and a plasticized zone.

The test piece P2 was prepared through the joining process with the intersection point e kept above the front face 2b of the second metal member 2, as shown in FIG. 10. A burr S was formed on the front face 2b of the second metal member 2 of the test piece P2 as shown in FIG. 15. The thickness of the burr S (which was a height from the front face 2b of the second metal member 2 to a top of the burr S) was 23 μm. As shown in FIG. 13, the fatigue strength of the test piece P2 was approximately 109 MPa, which was the highest value. That is, the test piece P2 had the smallest burr S and the highest fatigue strength.

Figure 16:
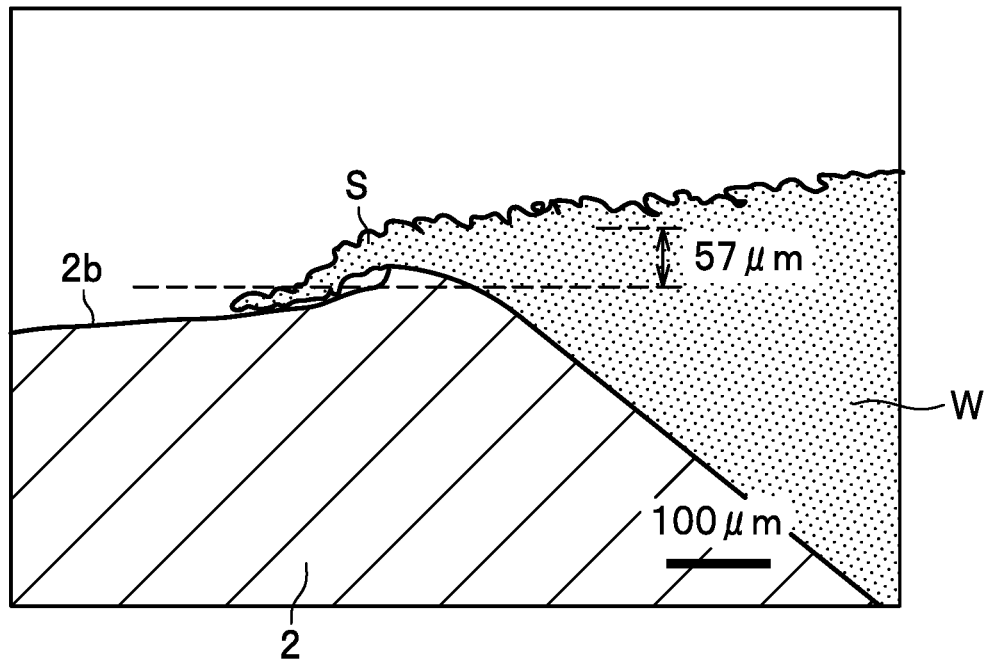
FIG. 16 shows schematically a macro structure of a test piece P3 for TEST 1 around a boundary between a front face of a second metal member and a plasticized zone.

The test piece P3 was prepared through the joining process with the intersection point e kept above the front face 2b of the second metal member 2, as shown in FIG. 10. The intersection point e for the test piece P3 was set at a higher position than the intersection point e for the test piece P2. A burr S was formed on the front face 2b of the second metal member 2 of the test piece P3, as shown in FIG. 16. The thick ness of the burr S was 57 μm. As shown in FIG. 13, the fatigue strength of the test piece P3 was approximately 88 MPa, which was the second highest value.

Figure 17:
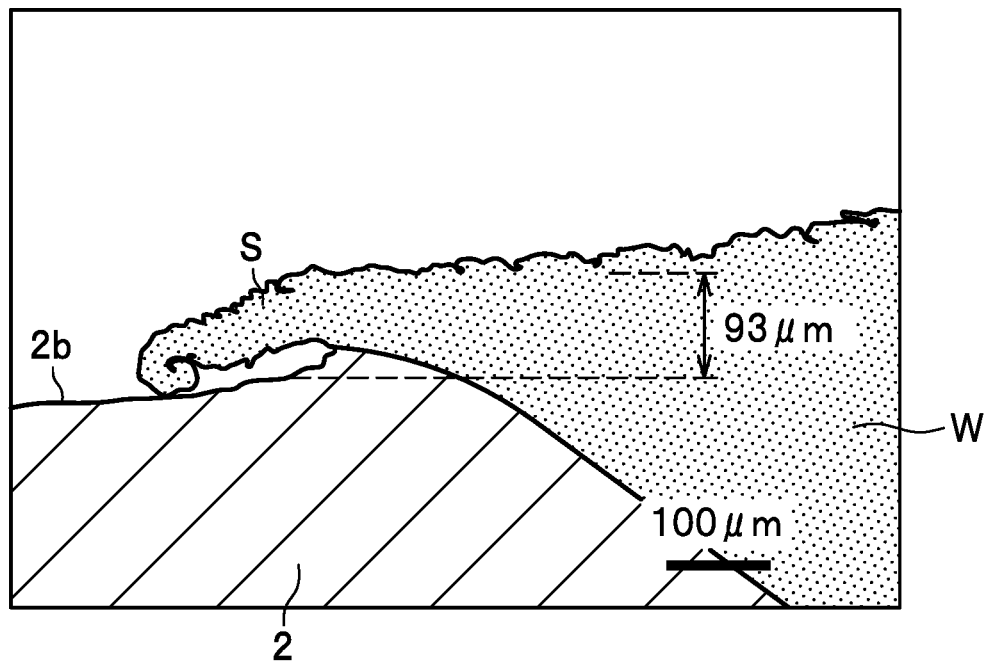
FIG. 17 shows schematically a macro structure of a test piece P4 for TEST 1 around a boundary between a front face of a second metal member and a plasticized zone.

The test piece P4 was prepared through the joining process with the intersection point e kept above the front face 2b of the second metal member 2. The intersection point e for the test piece P4 was set a higher position than the intersection point e for the test piece P3. A burr S was formed on the front face 2b of the second metal member 2 of the test piece P4, as shown in FIG. 17. The thickness of the burr S was 93 μm. As shown in FIG. 13, the fatigue strength of the test piece P4 was approximately 70 MPa, which was the third highest value.

The test piece P5 was prepared through the joining process with the intersection point e kept above the front face 2b of the second metal member 2, as shown in FIG. 10. The intersection point e for the test piece P5 was set as a higher position than the intersection point e for the test piece P4. The burr S formed on the test piece P5, which is not shown, is larger than the burr S formed on the test piece P4. As shown in FIG. 13, the fatigue strength of the test piece P5 was approximately 58 MPa, which was less than the threshold value. This indicates that the joint strength of the test piece lowers if the burr S becomes too large like the test piece P5.

The results of TEST 1 are summarized as follows. If the inclination angle (target angle) θ is too large, which is the case with the test piece 1, the fatigue strength lowers due to the formation of the undercut portion, which is not a preferable result. On the other hand, if the inclination angle (target angle) θ of the joining rotary tool F is too small, which corresponds to the test piece P5, the plastically flowing material cannot be sufficiently held down and the thickness of the burr becomes larger, which is not a preferable result. In the case of each of the test pieces P2 to P4, the thickness of the burr can be kept relatively small, and the fatigue strength does not lower to the threshold value and is within an acceptable range. In other words, it is preferable to set the inclination angle (target angle) θ of the joining rotary tool F to perform the joining process to such an angle that the thickness of the burr becomes between 0 and 130 μm.

In TEST 2, the thickness ratio of the first metal member 1 to the second metal member 2 was varied and three thickness ratios, which were "1:2.0 for CASE 1", "1:1.67 for CASE 2" and "1:1.33 for CASE 3", were tested. For each of the tested cases, test pieces were prepared through the joining processes with various inclination angles (target angle) θ. In CASE 1, three inclination angles (target angle) θ, 0°, 3°, 6°, were tested and the joining process was performed with each of the inclination angles (target angle) θ. In CASE 2, seven inclination angles (target angle) θ, 0°, 2°, 4°, 5°, 6°, 7°, 8°, were tested and the joining process was performed with each of the inclination angles (target angle) θ. In CASE 3, two inclination angles (target angle) θ, 2°, 3°, were tested and the joining process was performed with each of the inclination angles (target angle) θ.

Figure 18:
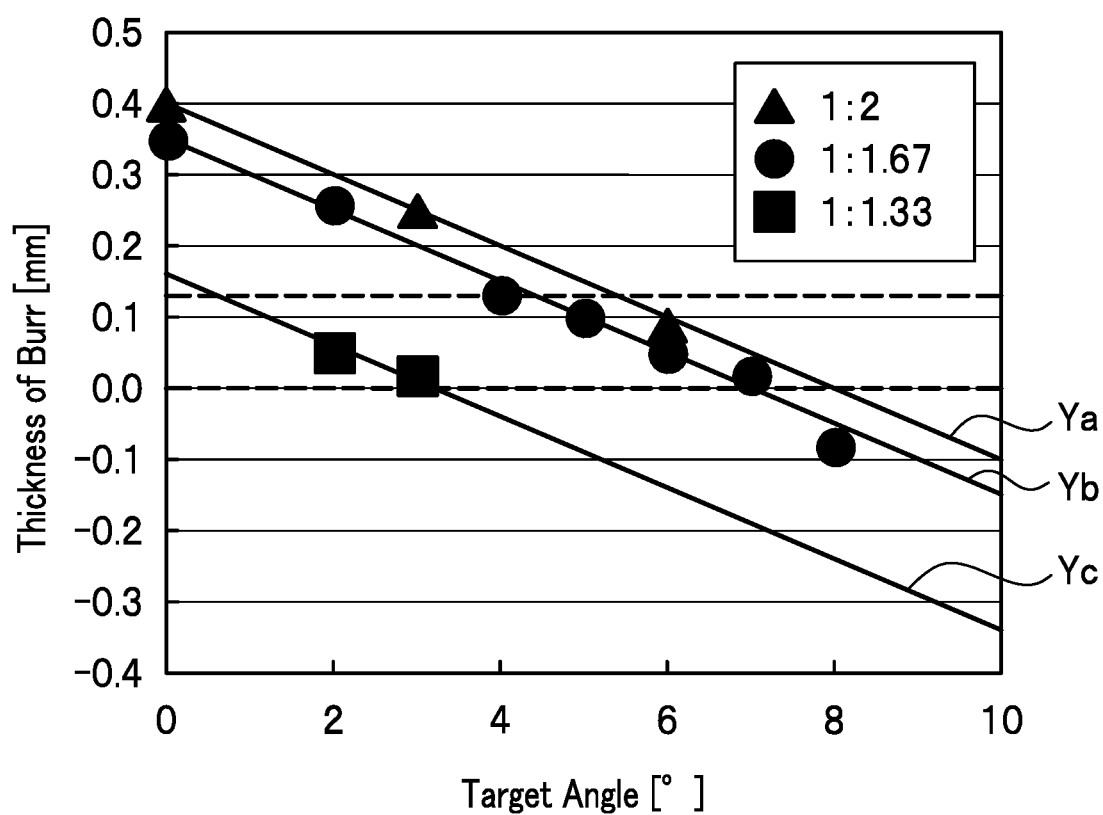
FIG. 18 is a graph showing a relation between the target angle and the thickness of the burr, which is derived from results of TEST 2.

As shown in FIG. 18, when the inclination angle (target angle) θ of the joining rotary tool F is 0° in CASE 1, the thickness of the burr S formed on the front face 2b of the second metal member 2 is 0.4 mm (400 μm), which is the largest. On the other hand, when the inclination angle (target angle) θ of the joining rotary tool F is 6° in CASE 1, the thickness of the burr S is smaller than 0.13 mm (130 μm), which is a preferable result.

As shown in FIG. 18, when the inclination angle (target angle) θ of the joining rotary tool F is 0° in CASE 2, the thickness of the burr S formed on the front face 2b of the second metal member 2 is 0.35 mm (350 μm), which is the largest. On the other hand, when the inclination angle (target angle) θ of the joining rotary tool F is 8° in CASE 2, the thickness of the burr S is less than 0 (the undercut portion K is formed). When the inclination angle (target angle) θ of the joining rotary tool F is between 4° and 7°, the thickness of the burr is between 0 and 0.13 mm (0~130 μm), which is preferable.

As shown in FIG. 18, when the inclination angle (target angle) θ of the joining rotary tool F for CASE 3 is between 0.5° and 3°, the thickness of the burr is between 0 and 0.13 mm (0~130 μm), which is preferable.

Based on the comparison of CASE 1 to CASE 3, it is noted that the inclination angle (target angle) θ of the joining rotary tool F needs to be set to a larger angle for CASE 1, which has a larger difference in the plate thickness between the first metal member 1 and the second metal member 2, than for CASE 3. On the contrary, the inclination angle (target angle) θ of the joining rotary tool F needs to be set to a smaller angle for CASE 3 having a smaller difference in the plate thickness between the first metal member 1 and the second metal member 2 than for CASE 1. It has turned out that the undercut portion K formed for CASE 3 tends to be larger if the inclination angle (target angle) θ is set to larger than 4°.

A method of least squares was applied to the result of CASE 1 and a correlation of Ya=−0.05 θ+0.40 was obtained. The method of least squares was applied to the result of CASE 2 and a correlation of Yb=−0.05 θ+0.35 was obtained. The method of least squares was also applied to the result of CASE 3 and a correlation of Yc=−0.05 θ+0.16 was obtained. When the thickness ratio of the first metal member 1 to the second metal member 2 is between 1.33 and 2, it is preferable that the rotation axis U of the joining rotary tool F is inclined toward the second metal member 2 so that the thickness of the resultant burr is between 0 and 130 μm while the inclination angle (target angle) θ(°) of the joining rotary tool F is set to such an angle that an inequality of −0.05 θ+0.16≤s≤−0.05 θ+0.40 is met, where s is the thickness of the burr S in mm.

DESCRIPTION OF SIGNS

1 First Metal Member
2 Second Metal Member
F Primary Joining Rotary Tool (Rotary Tool)
F2 Base Side Pin
F3 Tip Side Pin
J Butted Portion
S Burr
W Plasticized Zone

What is claimed is:

1. A joining method comprising;
    a butting process of butting an end face of a first metal member and an end face of a second metal member against each other to form a butted portion that is stepped with a second front face of the second metal member being lower than a first front face of the first metal member; and
    a joining process of performing friction-stir-welding on the butted portion that is stepped with a rotary tool,
    wherein the rotary tool includes a base side pin and a tip side pin, a taper angle of the base side pin is larger than a taper angle of the tip side pin, and a pin step portion with a stair shaped cross section formed on an outer circumferential face of the base side pin, and
    wherein in the joining process, a rotation direction and a translation direction of the rotary tool are set to such directions that the second metal member is on an advancing side, a target angle by which a rotation axis of the rotary tool is inclined toward the second metal member is set to such an angle that a burr formed after the joining process on the second front face of the second metal member has a thickness between 0 and 130 μm, and friction-stirring is performed with the target angle of the rotary tool kept unchanged and with a plastically flowing material being held down by a step bottom face of the pin step portion in the joining process.

2. The joining method as claimed in claim 1, wherein the target angle is set to such an angle that in a cross-sectional plane that includes a rotation axis of the rotary tool and is perpendicular to a translation direction in which the rotary tool moves, an intersection point e is positioned on or above the second front face of the second metal member, where the intersection point e is a point rotationally symmetrical to an intersection point d with respect to the rotation axis, the intersection point d being an intersection point between the outer circumferential face of the base side pin and the first front face of the first metal member.

3. The joining method as claimed in claim 1, wherein the target angle is set to such an angle that an inequality of −0.05θ+0.16≤s≤−0.05 θ+0.40 is met, where s is the thickness of the burr in mm and θ is the target angle (°), when a thickness ratio of the first metal member to the second metal member is between 1.33 and 2.

4. The joining method as claimed in claim 2, wherein the target angle is set to such an angle that an inequality of $-0.05\theta+0.16 \leq s \leq -0.05\theta+0.40$ is met, where s is the thickness of the burr in mm and $\theta$ is the target angle (°), when a thickness ratio of the first metal member to the second metal member is between 1.33 and 2.

* * * * *